US007023465B2

(12) United States Patent
Stephens, Jr.

(10) Patent No.: US 7,023,465 B2
(45) Date of Patent: *Apr. 4, 2006

(54) SYSTEM AND METHOD FOR COMMUNICATION DEVICE CONFIGURATION, SCHEDULING AND ACCESS CONTROL

(75) Inventor: James H. Stephens, Jr., Austin, TX (US)

(73) Assignee: Tandberg Telecom AS, Lysaker (NO)

(*) Notice: Subject to any disclaimer, the term of this patent is extended or adjusted under 35 U.S.C. 154(b) by 204 days.

This patent is subject to a terminal disclaimer.

(21) Appl. No.: 10/643,145

(22) Filed: Aug. 18, 2003

(65) Prior Publication Data

US 2004/0032485 A1 Feb. 19, 2004

Related U.S. Application Data

(63) Continuation-in-part of application No. 09/919,560, filed on Jul. 31, 2001, now Pat. No. 6,633,324.

(51) Int. Cl.
*H04N 7/14* (2006.01)

(52) U.S. Cl. .............................. 348/14.09; 379/93.21; 379/202.01; 370/261; 709/204

(58) Field of Classification Search ............. 348/14.08, 348/14.09, 14.01; 379/93.21, 202.01; 370/260, 370/261; 709/204
See application file for complete search history.

(56) References Cited

U.S. PATENT DOCUMENTS 6,157,401 A * 12/2000 Wiryaman ............... 348/14.09
6,633,324 B1 * 10/2003 Stephens, Jr. ............ 348/14.09

* cited by examiner

*Primary Examiner*—Wing Chan
(74) *Attorney, Agent, or Firm*—Oblon, Spivak, McClelland, Maier & Neustadt, P.C.

(57) ABSTRACT

A method and system configures conferences and schedules communication devices, such as video, audio, application sharing, streaming or other multimedia devices, based on a query from a user to request the conference. A configuration engine accepts conference information from a query engine based on the request and applies device data and rules, such as scheduling, configuration and access control rules, to determine one or more possible communication device configurations. The configuration engine or an associated optimization engine determines a preferred configuration and schedules communication devices without requiring the user to have any in depth understanding of the device limitations and capabilities.

39 Claims, 3 Drawing Sheets

| Device | Ports | Bandwidth | Reliability | Schedule |
|---|---|---|---|---|
| $MCU_1$ | 3 | 1.0Mbps | .95 | Open |
| $MCU_2$ | 10 | 1.5Mbps | .8 | 12:30-2:00 |
| $MCU_3$ | 5 | 1.0Mbps | .9 | 11:30-12:30 |
| $GW_1$ | 3 | 1.0Mbps | .8 | 11:00-2:00 |
| $GW_2$ | 5 | 1.5Mbps | .9 | Open |

| Device | Network | Protocol | Schedule |
|---|---|---|---|
| $EP_1$ | Subnet A | H.323 | Open |
| $EP_2$ | Subnet B | H.323 | Open |
| . | . | . | . |
| . | . | . | . |
| . | . | . | . |
| $EP_N$ | Subnet N | H.320 | Open |

SYSTEM AND METHOD FOR COMMUNICATION DEVICE CONFIGURATION, SCHEDULING AND ACCESS CONTROL

RELATED APPLICATIONS

The present application is a continuation-in-part of U.S. patent application Ser. No. 09/919,560, filed on Aug. 31, 2001 now U.S. Pat. No. 6,633,324 entitled "System and Method for Video Call Configuration and Scheduling," by James H. Stephens, Jr.

TECHNICAL FIELD

This invention relates generally to video call communications, and more specifically relates to a system and method for configuring and scheduling of video calls.

BACKGROUND

Video conference calls have developed from a novelty used rarely to grow into a commonly used business communication tool. Businesses often prefer the more personal communication available through video conferences compared with telephone conferences, and also enjoy savings in travel costs while still having a personal presence among the participants that is not possible with audio only communications. Further, video conferencing allows individuals at a number of disparate locations to share data, such as presentations and spreadsheets, while conducting a conference, thereby reducing the complexity of distributing written material before the conference occurs.

These advantages of video conferencing has resulted in a number of businesses installing video conferencing equipment for use by employees to communicate with other business locations across the business' network. Additionally, businesses commonly communicate outside of their network, such as with video equipment located in a customer's network, by establishing video calls through the public network.

The advantages and convenience of video calls are often offset by the difficulty of configuring and scheduling video calls in light of the limited video conferencing equipment available, the technical knowledge generally required to configure video calls, and demands on network bandwidths. For instance, a multi-point video conference call between three or more video end points typically requires the use of a multi-call unit (MCU) to coordinate the exchange of video data between the video end points. Thus, before establishing a multi-point video conference, the end point and MCU are configured to support the video conference. As another example, video end points sometime use different protocols so that a video conference between such end points typically requires a configuration with a gateway that insures a consistent communications pathway. In addition, for video conference calls that involve a large number of participants at distributed locations, the bandwidth generally used to support the multiple end points tends to exceed the capacity of individual MCU's and gateways so that multiple MCU's and gateways are needed to configure the video call.

To coordinate video conference equipment use, businesses typically dedicate staff that accepts requests for use of end points, schedules the video network devices to support the video call and coordinates and configures the video call. Maintaining staff for this purpose increases the expense of video conferencing and reduces its convenience. Further, for businesses with expensive video conferencing resources the task of coordinating use of those resources is complex and labor intensive. The complexity and labor associated with video conferencing grows as the number of participants outside the business' network increases.

A significant problem that businesses encounter with video conferencing is the under utilization and non-optimized use of video conferencing equipment. For instance, conference calls can be difficult to configure, especially complex calls that are configured with MCU's that are set up to accomplish the call. The use of a variety of different devices leads to scheduling difficulties for the resources that are available. In some instances, staff is simply overwhelmed and unable to keep up with video conferencing requests in a timely manner. This can lead to under utilization of the video conferencing equipment or an increase in staff size and corresponding increase in labor expense. Further, as the complexity of configuring and scheduling video conferences increases, business members are less likely to use video conferencing equipment because the time and hassle in arranging a video conference is not worthwhile. In addition, complexity leads to unreliability so that business members will avoid video conferences to reduce potential embarrassment when the conferences fail.

With the growing use of video calls and increased availability of bandwidth, the use of non-video communication devices during video calls has become increasingly common. For example, if a video device is not available at a desired time, some or all participants may have to use audio devices that require separate scheduling and arrangements, such as a telephone conference service provider. As another example, in order to exchange presentations and data video conferences often rely on application sharing services, such as through the WEBEX service, streaming feeds or other multimedia communication devices that also use separate scheduling and arrangements. Video network administrators face a substantial challenge in allocating and scheduling these additional resources, configuring a conference to include the desired resources and ensuring that the conference occurs as planned. The challenge grows if access to some resources is restricted, such as by requiring positive identification of participants limiting expensive resources to conferences that involve executives, requiring supervisor approval for conferences that cost over a defined amount or other business policies.

SUMMARY

Therefore a need has arisen for a system and method which automatically configures video calls in a simplified and efficient manner.

A further need has arisen for a system and method which schedules video calls automatically in a more optimized manner so that video conferencing equipment is more efficiently used.

A further need has arisen for a system and method which automatically schedules, configures and controls access to communication devices, such as video, audio, application sharing, streaming and other multimedia communication devices.

In accordance with the present invention, a system and method is provided that substantially eliminates disadvantages and problems associated with previously developed systems and methods for configuring video calls and scheduling those calls. A video network platform accepts queries with video call information for establishing a video call between plural video end points. A configuration engine associated with the video network platform applies rules and device data to determine one or more video call configurations available for scheduling a video call corresponding to the video call information.

More specifically, the video network platform analyzes queries for video calls, determines configurations to support the video calls and schedules video network devices accordingly. A rules based configuration engine accepts video call information from the queries and applies rules and device data to determine one or more video call configurations for a video call corresponding to the video call information. The device data is provided by a device database that stores information associated with devices available for the video call, such as video end points, MCU's and gateways. The device data includes information for establishing and maintaining a video call including device address, bandwidth, port, protocol, and scheduling availability information. The rules are provided by a rules database and define parameters for configuring and scheduling video calls. In alternative embodiments, the configuration engine uses alternative scheduling engines to determine potential video call configurations and schedules.

The configuration engine determines one or more video call configurations based upon the number, location and type of devices available. For instance, if a query requests a video conference between three end points, a rule applied by the configuration engine determines that an MCU is needed. The configuration engine then determines the available MCU's for configuring the video conference and presents the possible configurations for scheduling of the video call. In one embodiment, the configuration engine determines a preferred configuration and schedules the video call by saving the schedule information for the devices associated with the video conference in the device database.

An update engine interfaces with the device database to update the device data as device status changes on the video call network. For instance, if an end point, MCU or gateway device becomes inoperable, the update engine updates the scheduling data for the device in the device database so that the configuration engine will not schedule the device during down time. The update engine also tracks reliability information and stores the reliability information for devices in the device database. The configuration engine may then apply rules that use reliability information in determining video call configurations and scheduling devices for a video call.

An optimization engine interfaces with the configuration engine to aid in the selection of an efficient video call configuration based on desired optimization parameters. For instance, in one embodiment the optimization engine accepts possible video call configurations from the configuration engine and selects the most efficient of the possible video call configurations for scheduling of the devices associated with that video call configuration. In some instances, such as for complex video call networks with a relatively large number of devices, the number of possible video call configurations is quite large. In such instances, the optimization engine provides alternatives to the configuration engines so that the computations for determining possible configurations are reduced. For instance, the optimization engine may use estimation techniques that reduces the number of devices considered for a configuration. In yet another embodiment, the optimization engine considers existing schedules stored in the device database and computes a more optimal use of device resources, including rescheduling of devices to obtain better efficiency and utilization of the video call network as a whole.

In one embodiment, conference scheduling, configuration and access control are managed for a variety of communications devices, such as video, audio, application sharing, streaming and other multimedia devices. A rules-based configuration engine accepts a conference request and determines a communications device configuration for accomplishing the conference by applying rules to video device data, audio device and application sharing device data. Configuration rules applied by the configuration engine selects and sets up the communication devices necessary to support the conference, such as bridges, gateways, MCUs and application sharing servers. Access control rules applied by the configuration engine determine that the requested use of communications devices is authorized, such as ensuring that a requested use is not restricted by business policies. Scheduling rules applied by the configuration engine automatically determine available times of communications devices for the conference. The configuration engine's consideration of a variety of communications devices provides greater flexibility in fulfilling conference requests by offering a greater variety of possible configurations, such as having a greater number of alternative communications devices available and offering alternative conferencing options like audio conferencing when video conferencing is unavailable.

The present invention provides a number of important technical advantages. One important technical advantage is that the configuration and scheduling of video calls is automated and simplified. The reduced complexity reduces the labor and cost associated with arranging video calls and increases the convenience so that individuals are encouraged to use video call devices. Further, establishing video calls between different video call networks is simplified by providing device data for the different networks in the device database. Thus, a central video network platform offers configuration and scheduling services for multiple companies in a straight forward and cost-effective manner.

Another important technical advantage of the present invention is that video call networks are used in a more efficient manner. By reducing complexity and simplifying call configuration and scheduling, device resources are less likely to go unused since coordination through scheduling staff is reduced. Further, optimization of schedules improves the utilization of devices so that the size and cost of a business' video call network may be reduced.

Another important technical advantage is that a single configuration engine coordinates conferences through a variety of communications device types, like video, audio and application sharing devices to simplify network management and improve communication device utilization. Configuration rules for a variety of multimedia device options address conference requests without network administration coordination to arrange the conference by automatically assigning support devices such as bridges, gateways, MCU's and servers without requiring the conference requester to have the expertise in configuration requirements. Access control rules restrict communication device access to authorized personnel or uses thus reducing the burden on network administrators in the management of communication device resources. Scheduling rules encourage full use of network resources without overbooking of communications devices and offer viable alternative conferences where a particular request cannot be filled.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments of the present invention are illustrated in the figures, like numerals being used to refer to like and corresponding parts of the various drawings.

Ideally, a user who wishes to arrange a video call generally prefers a simplified interface for establishing the video call, much as a telephone call usually requires only the input of a phone number into a numerical pad. Unfortunately, video calls, especially large conference calls, tend to require device resources that support the call but are otherwise hidden from the user during the call. Thus, to configure and schedule a video call, a user has to deal with devices that supports the video call with which the user generally is otherwise unfamiliar.

Figure 1:
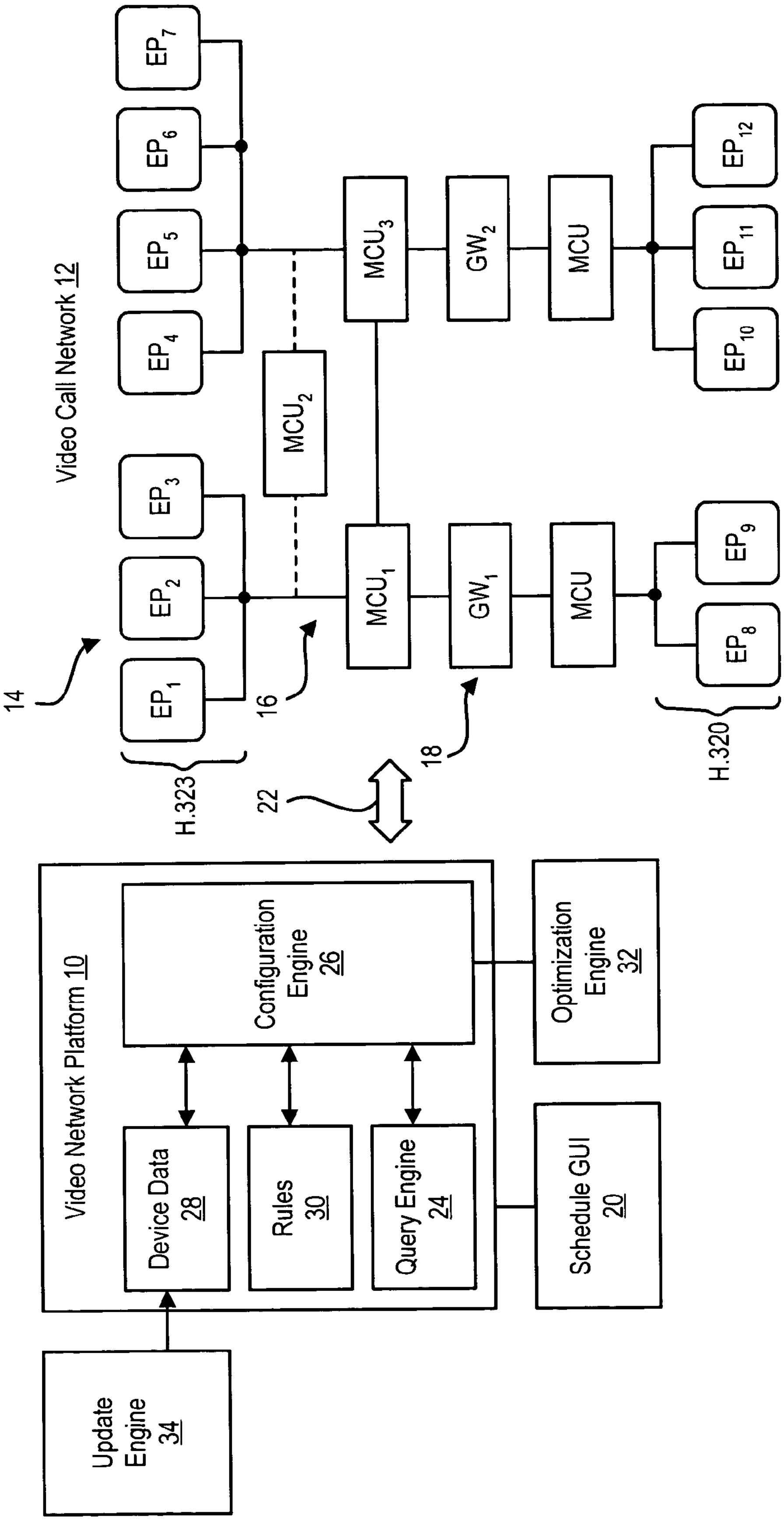
FIG. 1 depicts a block diagram of a video network platform interfaced with a video call network.

Referring now to FIG. 1, a block diagram depicts a video network platform 10 interfaced with a video call network 12. Video call network 12 includes twelve video end points 14 that display video calls to end users, five MCUs 16 that coordinate multi-point video conference calls, and two gateways 18 that coordinate interfaces with endpoints using different protocols. For instance, end points 8–12 use protocol H320 and coordinate communications through gateways 18 in order to maintain video calls with end points 1–7, which use protocol H.323. MCUs provide video data from end points 8 and 9 to gateway 1 and from end points 10–12 to gateway 2. Video call network 12 illustrates the manner in which end points, MCUs and gateways are typically used to configure video calls, whether the calls are configured over a single business' video call network or across public telecommunication provider networks to support communications from one business' video call network to another business' video call network.

Video network platform 10 provides automated configuration and scheduling of video calls based on queries received through a scheduling graphical user interface 20. For instance, a user seeking to set up a video call queries video network platform 10 through scheduling graphical user interface 20 regarding the availability of device resources to support a video call between desired end points 14. Video network platform 10 then determines possible configurations and provides the configurations to the scheduling graphical user interface 20 so that the user may schedule devices according to a desired configuration. Alternatively, video network platform 10 determines possible video call configurations and presents the user with the preferred configuration for the user to confirm scheduling. Scheduling graphical user interface 20 may be presented as a web browser page or may be presented through end points 14 using an internet or other network interface 22 that supports communications between video network platform 10 and video call network 12.

A query engine 24 accepts scheduling requests from scheduling graphical user interface 20 and determines video call information from the scheduling requests. For instance, query engine 24 determines the end points 14 involved in the requested video call and the time periods for the requested video call. Query engine 24 provides the video call information to configuration engine 26 which applies device data from device database 28 and rules from rules database 30 to determine possible configurations for the requested video call based on the video call information.

Figures 2, 3, 4:
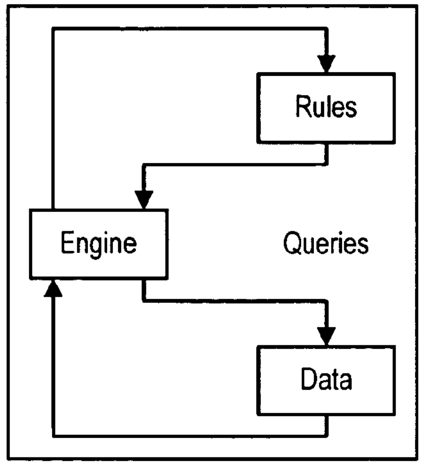
FIG. 2 depicts a block diagram of a rules-based engine.
FIG. 3 depicts a device database storing device data for use by a configuration engine.
FIG. 4 depicts a device database storing end point device data for use by a configuration engine.

Referring briefly to FIG. 2, a block diagram depicts the rules-based approach used by one embodiment of configuration engine 26. Configuration engine 26 is an expert system that accepts queries and applies rules and data to determine video call configurations and schedule video calls. For instance, configuration engine 26 may use a Prolog logic programming language such as XSB, a Prolog-based system available to the public under a GNU library general public license. Although Prolog applications provide good capabilities for scheduling, their pure rules-based approach sometimes does not scale well for larger scheduling problems. Thus, in alternative embodiments in which greater numbers of resource devices are involved, estimation and pruning techniques limit the number of calculations and result in computation of only the most desired configurations in a shorter period of time. Alternative scheduling techniques are also possible either by direct implementation in the configuration engine 26 or by forwarding complex scheduling problems to a separate module.

Referring back to FIG. 1, one alternative for determining an optimal configuration to schedule devices is optimization engine 32. For instance, if configuration engine 26 is a rules-based engine then one rule may direct configuration engine 26 to forward scheduling problems of a predetermined magnitude to optimization engine 32 for a solution. In some instances, such as when the device resources of video call network 12 are near full utilization, the optimization engine 32 may consider overall device scheduling data to optimize the utilization of the device resources in accordance with system priorities as reflected by optimization factors. In another embodiment, optimization engine 32 receives plural video call configurations from configuration engine 26 and determines the preferred video call configuration for scheduling of the video call. In yet another embodiment, the configuration engine could suggest alternatives, such as using alternate calls ("use ep13 instead of ep12"), using alternate call characteristics ("you can do a 384 Kpbs call but not your requested 768 Kpbs call"), and/or using alternate schedules ("you can do your call at 10:00 but not at the requested 11:00").

One factor that affects available video call configurations and the selection of a call configuration for scheduling is the status of devices in video call network 12. An update engine 34 interfaces with device database 28 to maintain accurate data on devices by updating device database 28 when devices change their operational status. For instance, if an MCU becomes non-operational, update engine 34 provides device database 28 with the timeframe for the devices non-operational status so that video call configurations will not include the non-operational device and scheduled video calls that do include the non operational device can be reconfigured by configuration engine 26. In the process of tracking changes in the status of devices, update engine 34 also computes reliability information for storage in device database 28 and for use in determining call configurations. For instance, query engine 24 may assign a priority to a video call request based on participants of the video call so that configuration engine 26 considers device reliability and establishes call configurations for higher priority video calls with more reliable video devices.

The advantages of the video network platform 10 are illustrated through an example of determining video call configurations and scheduling a video call based on an exemplary scheduling request. For instance, a user inputs a request into scheduling graphical user interface 20 for a one hour video conference call at noon among six end points 14, including H.320 end points 10–12 and H.323 end points 1–3. Configuration engine 26 accepts call information from query engine 24 and provides automated determination of device resources available for configuring the requested video call without direct knowledge by the user of the devices, the device capabilities, the device limitations, or the schedules for the devices.

Configuration engine 26 obtains device data from device database 28, such as the device data illustrated by the tables of FIG. 3 and FIG. 4. Applying rules from rules database 30, configuration engine 26 determines that end points 1–3 each use the H.323 protocol from the table of FIG. 4 and require an MCU. For instance, a rule from rules database 30 is applied that states that multi point video calls involving three or more end points require an MCU. Similarly, configuration engine 26 determines that end points 10, 11 and 12 are H.320 protocol end points that require a gateway 18 and an MCU. For instance, configuration engine 26 applies a rule from rules database 30 that states that video call requests between end points with different protocols require the use of a gateway. Other rules in rules database 30 define parameters that configuration engine 26 applies to device data from device database 28 to determine possible video call configurations.

Applying the rules and device data, configuration engine 26 determines a configuration of end points 1, 2 and 3 interfacing with MCU 1 and end points 10, 11 and 12 interfacing with gateway 2 through MCU 3 with the video call completed by interfacing MCU 1 and MCU 3. However, referring to FIG. 3, MCU 3 is currently scheduled for a video call from 11:30 to 12:30. Configuration engine 26 may provide this information to schedule graphical user interface 20 for reference by the user or may provide the information to optimization engine 32 to determine if a video call can be scheduled with the available resources. Optimization engine 32 determines that a schedule for the video call is possible if the call currently scheduled from 11:30 to 12:30 on MCU 3 is reassigned to MCU 2. Once a determination is made of possible call configurations, those call configurations are passed to scheduling graphical user interface 20 for approval by the user. Other factors that may be considered by configuration engine 26 include the number of ports for the MCUs and gateways, the bandwidth capacity of the MCUs and gateways, and the reliability of the MCUs and gateways.

The above example provides a relatively simple application of rules and device data by configuration engine 26 to determine a call configuration and schedule a video call in a video call network 12 of relatively limited size and complexity. However, the video network platform 10 provides a capability to handle a variety of parameters and rules for determining call configurations and scheduling video calls in more complex video call networks 12. Device database 28 may, for instance, include parameters that define the number of concurrent sessions that a given MCU can handle and transcode simultaneously, a bandwidth capacity of MCUs and gateways, the protocols of MCUs, gateways and end points, IP addresses for devices of the video call network, identification and limitations of other network equipment such as routers, and limitations on particular devices such as prohibitions for a particular end point to make international calls. In addition, device database 28 stores schedule information for devices, such as the bandwidth supported by devices in defined time periods, the use of specific end points in defined time periods and the availability of devices for maintenance reasons.

The rules provided by rules database 30 define constraints for devices to be included in a video call configuration, such as that a connection not consume more than a maximum resource available from the affected devices, that devices can connect directly only if the devices use a common protocol, that IP devices can communicate directly if the devices are on the same subnet, that a configuration be selected for scheduling if the configuration has the shortest route among the possible configurations, and that the configurations be reported only if the number of links are less than a predetermined number. By adapting rules to address issues for a particular video call network, the video network platform 10 simplifies interaction with improves the efficiency of video call networks of all sizes, complexities and types.

Figure 5:
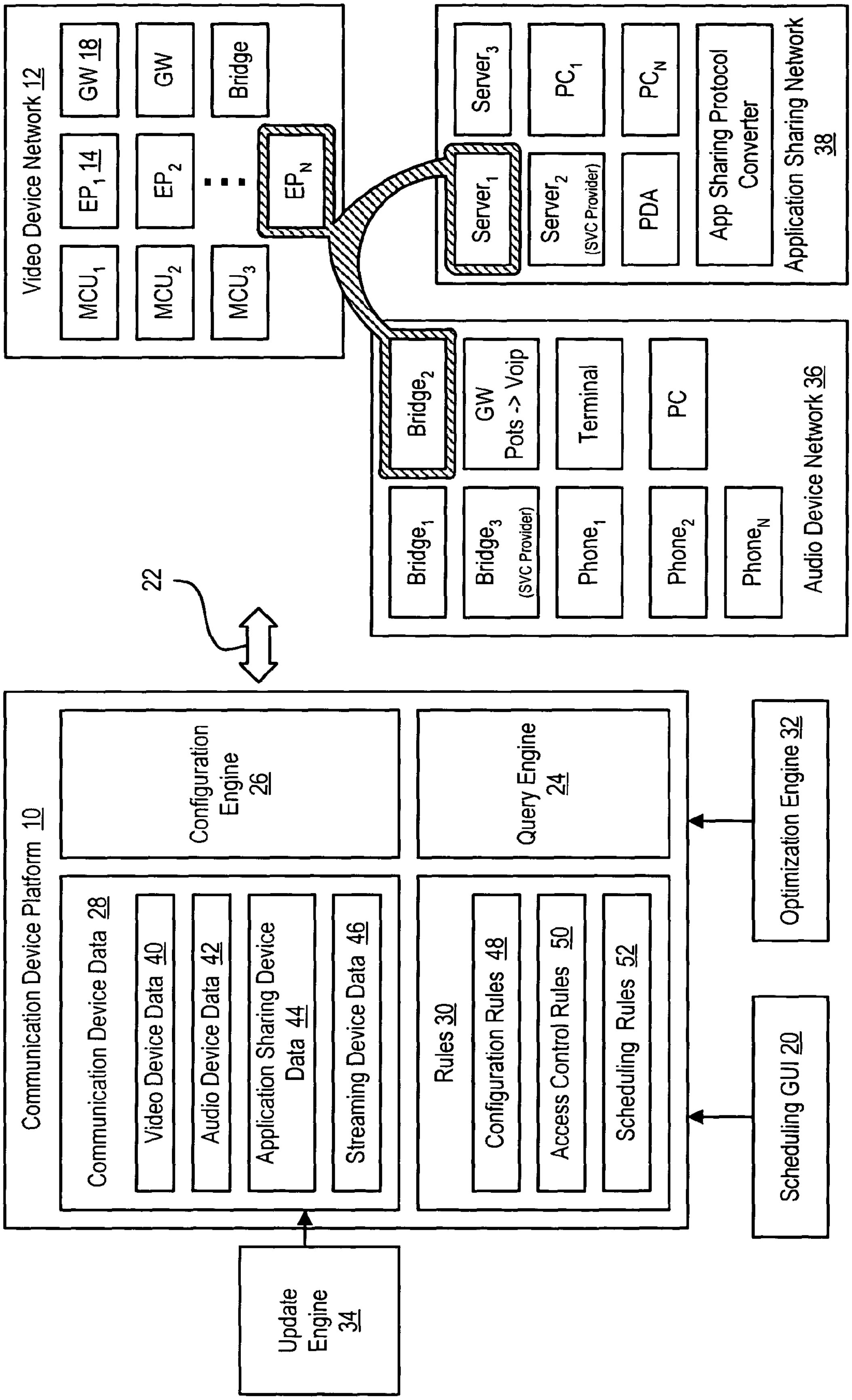
FIG. 5 depicts a block diagram of a communications device platform interfaced with video, audio and application sharing networks.

Referring now to FIG. 5, block diagram depicts an alternative embodiment of the present invention that manages use of a variety of types of communications devices. Communication device platform 10 interfaces with video network 12, audio network 36 and application sharing network 38 to configure, control access and schedule video, audio and application sharing devices to satisfy conference requests. Audio network 36 includes a variety of devices that provide or support audio communication, including telephones, bridges, third-party service provider bridges, VoIP to POTS gateways and personal computers having VoIP capability. Application sharing network 38 includes a variety of devices that provide or support data transfers though application sharing, including servers, third-party service provider servers such as WEBEX, personal computers and PDA devices. In alternative embodiments, communication device platform 10 may interface with other types of networks, such as networks that support streaming devices or other types of multimedia content.

Communication device platform 10 accepts conference requests through scheduling GUI 20 and query engine 24. Conference configurations are determined by configuration engine 26 to satisfy the conference request with communications devices available from video network 12, audio device network 36 and application sharing network 38. In order to determine possible conference configurations, configuration engine 26 applies communication device data 28 for each type of available communication device, including video device data 40, audio device data 42, application sharing device data 44 and streaming device data 46, to determine available resources having the capability of satisfying the conference. The communication device data is applied to rules that determine one or more sets of communications devices that will satisfy the conference request, including configuration rules 48, access control rules 50 and scheduling rules 52.

Configuration rules 48 define the communications devices required to accomplish the desired conference. For instance, a conference request identifies the communications devices to be involved in the conference by device name or location. A conference request may include a mixture of device types, such as video endpoints and audio endpoints associated with personal computers that perform application sharing. Configuration engine 26 applies configuration rules 48 to determine communications devices required to interface the requested endpoints, such as bridges, gateways and MCU's. For example, a conference request between plural video and audio endpoints that includes application sharing will call for support from communications devices of video network 12, audio network 42 and application sharing network 44, including one or more MCU's, one or more audio bridges and an application sharing server. Configuration rules ensure a valid configuration is selected from the communications devices of the networks with improved flexibility by using multi-purpose devices to support configuration options, such as requiring H.320 protocol use for international video conferences. For instance, a video conference might use a third-party audio network bridge as an option to using only video network devices for video conferences. As another example, with a request for application sharing, configuration rules 48 automatically includes video or audio endpoints associated with personal computers that display the application sharing since at least verbal communication is likely with the use of application sharing devices. Configuration rules 48 may also offer alternative configurations when communications devices are not available to support a requested conference. For instance, if a requested video conference cannot be served due to a lack of operable bridges, an audio conference configuration is offered as the next best solution.

Access control rules 50 define authorized users for predetermined devices, functions, requested uses or other factors. Access control rules 50 automatically apply business policies and desired resource allocation without requiring active intervention by network administration. For example, one access control rule is to require all conferences to be dial out, not dial in to enhance security by making a bridge call known numbers. A related example of an access control rule is to require all dial-in conferences to require an access code to authenticate inbound callers. Another example of an access control rule is to restrict communications device use to predetermined classes of individuals. A restriction of video conferences above a predetermined transfer rate, such as 512 Kbs, to only executives reserves communications device resources to aid in the quality of conferences deemed by business policy as more important. A restriction of a communications device associated with a geographic location, such as a bridge located in Austin, to use by conferences involving employees at the geographic location allocates resources among business units. Another example of an access control rule is to limit the expense of conferences, such as by requiring network administration approval for any conferences that exceed a predetermined cost or that interface with outside parties.

Scheduling rules 52 define the availability of communications devices for requested conferences to allow configuration engine 26 to automatically determine available configurations for a requested conference or, alternatively, find a time in which communications devices are available for a requested conference to be performed. A relatively simple scheduling rule is to require a predetermined time period between uses of a communications device to avoid overlapping conferences. Another example is provide priority for the use of one or more defined communications devices over other devices. Such a rule might require scheduling with a first bridge until it is fully utilized and then ordered spillover scheduling to a second, third or other bridge. A priority rule encourages full utilization of internal resources before external fee-based service provider resources are scheduled. A priority rule also emphasizes desired uses for specialized devices before more generalized devices are used. For instance, a scheduling rule prioritizes internal audio bridges for audio conference calls, then for video calls. As another example, a video conference prioritizes the use of a physical MCU before spilling over to server-based MCU modules. The prioritized use of specialized equipment over server-based modules reduces the use of more flexible server solutions that may perform multiple communication device functions.

As is depicted by FIG. 5, the application of configuration, access control and scheduling rules to communications device data may result in scheduled configurations, indicated by the shaded region, that include devices from the video, audio and application sharing networks. Comprehensive rules support input of generalized conference requests by non-trained individuals to obtain available viable configurations of devices that will support the desired conference. Network administration need spend less time and resources helping configure and setup conferences to instead focus of efficient and proper operation of the devices, thus providing better conference options at a reduced cost.

Although the present invention has been described in detail, it should be understood that various changes, substitutions and alterations can be made hereto without departing from the spirit and scope of the invention as defined by the appending claims.

What is claimed is:

1. A method for configuring a conference among communications devices, the method comprising:

querying a platform with conference information for establishing a conference between plural communication devices;

providing the conference information to a rules-based engine; and applying rules and communication device data with the rules-based engine to determine one or more communication device configurations for a conference corresponding to the conference information.

2. The method of claim 1 wherein the communication device data comprises schedule information for communication devices associated with the one or more conference configurations.

3. The method of claim 1 wherein the communications device comprises an audio communications device.

4. The method of claim 1 wherein the communications device comprises an application sharing communications device.

5. The method of claim 1 wherein communications device comprises a streaming communications device.

6. The method of claim 1 wherein one or more of the devices comprises a video communications device.

7. The method of claim 1 wherein the communications device data comprises bandwidth associated with one or more communications devices.

8. The method of claim 1 further comprising: determining plural communication device configurations for a conference corresponding to the conference information;

selecting one of the communication device configurations based on one or more predetermined optimization factors; and scheduling the communication devices associated with the optimal communications device configuration for accomplishing the conference call.

9. The method of claim 8 wherein the optimization factors comprise the cost associated with the communications device configurations.

10. The method of claim 9 wherein the optimization factors comprise the reliability associated with the communications device configurations.

11. The method of claim 1 further comprising updating the communications device data to reflect changes in the status of the communications devices.

12. The method of claim 1 wherein a rule comprises that conference information having a request for a video conference will have an audio conference configured with audio communications devices if video communications devices are unavailable to support the requested video conference.

13. The method of claim 1 wherein a rule comprises that conference information having a request for application sharing communications devices will require a conference with audio or video communications devices.

14. The method of claim 1 wherein a rule comprises that a conference not exceed predetermined resource consumption without an approval code.

15. The method of claim 1 wherein a rule comprises that predetermined users are permitted access to a predetermined communications device.

16. The method of claim 1 wherein a rule comprises that a communications device configuration have access codes for each communications device of a conference that dials into the conference in order to authenticate all inbound callers.

17. A system for configuring a conference between plural communications devices, the system comprising:

a query engine that accepts conference information associated with a scheduling request for communications devices;

a communication device database that stores data associated with communications devices;

a rules database that stores rules associated with the configuration of conferences with the communication devices; and a configuration engine interfaced with the query engine, the device database and the rules database, the configuration engine applying the conference information, the communication device data and the rules to determine one or more communication device configurations for the conference.

18. The system of claim 17 further comprising an update engine interfaced with the communication device database, the update engine maintaining device data to reflect changes in the status of communication devices.

19. The system of claim 17 further comprising an optimization engine operable to select one of the communication device configurations based on predetermined optimization factors.

20. The system of claim 17 wherein the configuration engine is operable to select one of the communication device configurations and schedule the associated communication devices for accomplishing the conference.

21. The system of claim 20 further comprising an optimization engine associated with the configuration engine, the optimization engine operable to optimize the communication device schedules according to predetermined optimization factors.

22. The system of claim 17 wherein the configuration engine is further operable to provide a user with the plural configurations and accept a configuration selection by the user for scheduling a conference.

23. The system of claim 17 wherein the communication devices comprise audio devices.

24. The system of claim 17 wherein the communication devices comprise application sharing devices.

25. The system of claim 17 wherein the communication devices comprise video devices.

26. The system of claim 17 wherein the communication devices comprise streaming devices.

27. The system of claim 17 wherein the scheduling request comprises a request for a conference by video devices and the configuration engine is further operable to schedule audio devices if video devices are unavailable.

28. The system of claim 17 wherein the rules comprise access control rules that restrict one or more predetermined communication devices by one or more access control factors.

29. A system for managing communications devices, the system comprising:

a configuration rules module having configuration rules for interfacing the communication devices;

an access control rules module having access control rules for restricting access to predetermined communication devices according to predetermined conditions;

a scheduling rules module having scheduling rules for scheduling communication devices for conferences; and a rules-based engine operable to accept requests for a conference with communication devices and to apply the configuration, scheduling and access rules to configure and schedule the conference.

30. The system of claim 29 wherein the communications devices comprise video, audio and application sharing devices.

31. The system of claim 29 wherein a configuration rule comprises that a MCU is required for video conferences between three or more video communication devices.

32. The system of claim 29 wherein a scheduling rule comprises that a first set of predetermined communications devices have priority over a second set of communications devices.

33. The system of claim 32 wherein the first set of communications devices comprise devices internal to a business and the second set of communications devices comprise devices associated with a service provider external to the business.

34. The system of claim 29 wherein an access control rule comprises that a conference configure as a dial-out conference in which a bridge communications device calls endpoint communications devices.

35. The system of claim 29 wherein an access control rule comprises that a conference configured as a dial-in conference require an access code for in-bound callers.

36. The system of claim 29 wherein an access control rule comprises that only a predetermined set of individuals may use a predetermined communications device function.

37. The system of claim 36 wherein the predetermined communications device function comprises communication in excess of a predetermined bandwidth allocation.

38. The system of claim 36 wherein the set of individuals comprise individual associated with a geographic location and the communications device function comprises access to a communications device at the geographic location.

39. An apparatus for configuring a conference among communications devices, comprising:

means for querying a platform with conference information for establishing a conference between plural communication devices;

means for providing the conference information to a rules-based engine; and means for applying rules and communication device data with the rules-based engine to determine one or more communication device configurations for a conference corresponding to the conference information.

* * * * *